United States Patent
Huang et al.

(10) Patent No.: US 11,671,257 B2
(45) Date of Patent: Jun. 6, 2023

(54) MOBILITY DATA STORAGE METHOD AND SYSTEM

(71) Applicant: DENSO CORPORATION, Kariya (JP)

(72) Inventors: Haolun Huang, Kariya (JP); Tatsuya Okabe, Kariya (JP); Himank Gupta, Kariya (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 17/352,897

(22) Filed: Jun. 21, 2021

(65) Prior Publication Data

US 2022/0407705 A1    Dec. 22, 2022

(51) Int. Cl.
*H04L 9/32* (2006.01)
*H04L 9/08* (2006.01)
*H04L 9/06* (2006.01)
*H04L 67/12* (2022.01)
*H04L 9/00* (2022.01)

(52) U.S. Cl.
CPC .......... *H04L 9/3218* (2013.01); *H04L 9/0643* (2013.01); *H04L 9/0825* (2013.01); *H04L 9/0869* (2013.01); *H04L 67/12* (2013.01); *H04L 9/50* (2022.05); *H04L 2209/84* (2013.01)

(58) Field of Classification Search
CPC ... H04L 9/3218; H04L 9/0643; H04L 9/0825; H04L 9/0869; H04L 67/12; H04L 9/50; H04L 2209/84
See application file for complete search history.

(56) References Cited

U.S. PATENT DOCUMENTS

| | | | |
|---|---|---|---|
| 11,212,671 B2 * | 12/2021 | Hutchison | H04W 4/38 |
| 2021/0304218 A1 * | 9/2021 | Bahrami | H04L 63/08 |
| 2022/0012356 A1 * | 1/2022 | McFarland, Jr. | G06F 21/602 |
| 2022/0126788 A1 * | 4/2022 | Hassani | H04L 9/0825 |
| 2022/0216991 A1 * | 7/2022 | Cain, Jr. | H04L 9/3297 |
| 2022/0398683 A1 * | 12/2022 | Andreina | G06Q 50/265 |

FOREIGN PATENT DOCUMENTS

WO    WO-2022150124 A1 *    7/2022    .............. B60R 25/24

OTHER PUBLICATIONS

Micali et al., Verifiable Random Functions, 1999 (Year: 1999).*
Silvio Micali et al., "Verifiable Random Functions", 11 pgs.
Mustafa Al-Bassam et al., "Fraud and Data Availability Proofs: Maximising Light Client Security and Scaling Blockchains with Dishonest Majorities", 34 pgs.

* cited by examiner

*Primary Examiner* — Taghi T Arani
*Assistant Examiner* — Blake I Narramore
(74) *Attorney, Agent, or Firm* — Maschoff Brennan (57) ABSTRACT

A mobility data storage method executed by a plurality of vehicles each including a sensor and a processor coupled to the sensor, the processor of each of the plurality of vehicles being configured to store a local blockchain, the method includes, with the processor of the plurality of vehicles, attaching a sensor data pool, a random value that excess a threshold, and a verifiable random function (VRF) proof to a respective candidate block then broadcasting the candidate block to all other vehicles. Then, a particular candidate block whose random value is largest among the broadcasted candidate blocks is selected and verified with the VRF proof prior to be attached to the local blockchain.

12 Claims, 9 Drawing Sheets

ABILITY DATA STORAGE METHOD AND SYSTEM

TECHNICAL FIELD

The present disclosure relates to a mobility data storage method and system.

BACKGROUND

Consensus based algorithms are widely used in multi-agent systems to improve data confidence. In particular, blockchain technology allows consensus algorithms to be deployed on dynamic networks which can be constructed and deconstructed freely, while still providing improved data confidence.

A subset of blockchain technology is directed toward permission-based networks in which nodes are granted permission in advance by a central authority to join or leave each network. In these kind of systems, the right to mine blocks may be implicitly held by each node with prior permission, which removes the need for a barrier to entry such as proof of work. For example, in mobility systems, dynamic blockchain networks may be constructed based on physical proximity between multiple vehicles, and each vehicle within the blockchain network may be implicitly permitted to mine blocks based on identification information such as a vehicle identification number (VIN).

Nevertheless, to provide improved data confidence and also to reduce the threat of an insider attack, the right to commit blocks may be randomly selected among the vehicles in the blockchain network. In this case, there is room for improvement with regard to the algorithms for determining right to commit blocks.

SUMMARY

According to one aspect of the present disclosure, a mobility data storage method is executed by a plurality of vehicles each including a sensor and a processor coupled to the sensor, the processor of each of the plurality of vehicles being configured to store a local blockchain, the method including acquiring, with the processor of each of the plurality of vehicles, sensor data via the sensor and broadcasting the sensor data to all other ones of the plurality of vehicles to generate a sensor data pool, generating, with the processor of each of the plurality of vehicles, a random value, generating, with the processor of each of a subset of the plurality of vehicles whose corresponding random value is greater than a predetermined threshold, a verifiable random function (VRF) proof using the corresponding random value as an input value for the VRF, attaching, with the processor of each of the subset of the plurality of vehicles, the sensor data pool, the corresponding random value, and the corresponding VRF proof to a respective candidate block, broadcasting, with the processor of each of the subset of the plurality of vehicles, the candidate block to all other processors of the plurality of vehicles, selecting, with the processor of each of the plurality of vehicles, a particular candidate block whose random value is largest among the broadcasted candidate blocks, verifying, with the processor of each of the plurality of vehicles, the random value and the VRF proof attached to the selected block against a public key of the corresponding vehicle whose processor broadcasted the selected block, and attaching, with the processor of each of the plurality of vehicles, the selected block to the corresponding local blockchain upon valid verification of the selected block.

According to another aspect of the present disclosure, a mobility data storage system includes a plurality of vehicles each including a sensor and a processor coupled to the sensor, the sensor being configured to acquire sensor data, the processor of each of the plurality of vehicles being configured to store a local blockchain. The processor of each of the plurality of vehicles is programmed to broadcast the sensor data to all other ones of the plurality of vehicles to generate a sensor data pool, generate a random value, when the generated random value is great than a predetermined threshold: generate a verifiable random function (VRF) proof using the random value as an input value for the VRF, attach the sensor data pool, the random value, and the VRF proof to a candidate block, and broadcast the candidate block to all other processors of the plurality of vehicles, select a particular candidate block whose random value is largest among the broadcasted candidate blocks, verify the random value and the VRF proof attached to the selected block against a public key of the corresponding vehicle whose processor broadcasted the selected block, and attach the selected block to the local blockchain upon valid verification of the selected block.

DETAILED DESCRIPTION

First Embodiment

A first embodiment of the present disclosure will be explained with reference to FIGS. 1 to 8.

Figure 1:
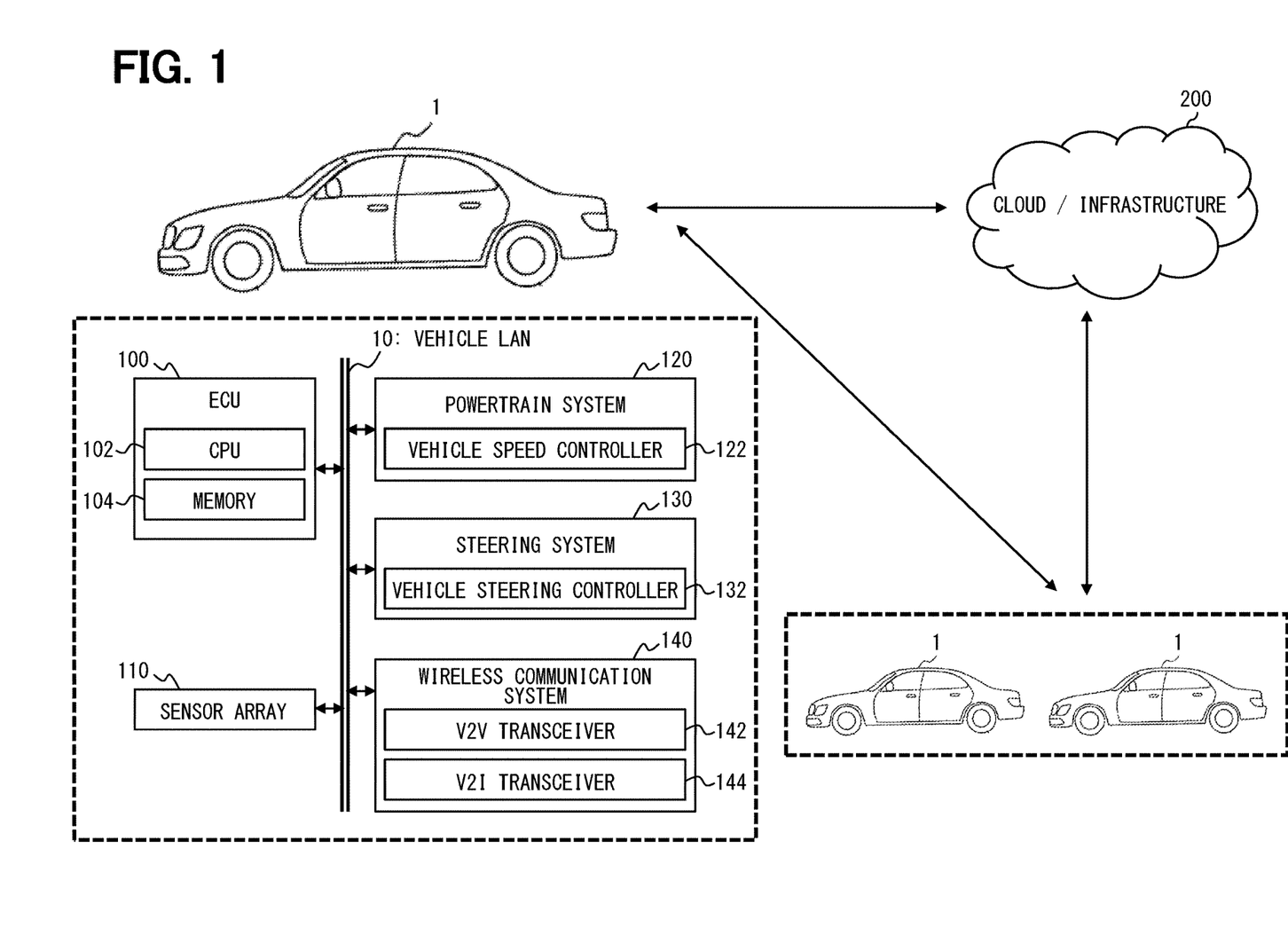
FIG. 1 is an overview of a mobility system.

As illustrated, a vehicle 1 includes a variety of on-board systems in which a vehicle local-area network (LAN) 10 serves as a network bus that interconnects an electronic control unit (ECU) 100, a sensor array 110, a powertrain system 120, a steering system 130, and a wireless communication system 140.

The ECU 100 is a processor which includes a central processing unit (CPU) 102 and a memory 104. The CPU 102 may be implemented as an integrated system-on-a-chip type microprocessor or a combination of a plurality of microprocessors. The memory 104 is preferably a semiconductor memory such as random access memory (RAM), read only memory (ROM), flash memory, of a combination of these. The memory 104 has stored thereon instructions which program the CPU 102 to perform a variety of tasks as will be described later. The ECU 100 serves as a vehicle controller which controls the vehicle 1.

The sensor array 110 is a collection of various sensors typically found in automobiles, such as a speedometer and an accelerator degree sensor. In the present embodiment, the vehicle 1 is preferably configured to perform autonomous driving (as will be described later), in which case the sensor array 110 would also include sensors related to autonomous driving, such as cameras, LIDARs, GPS devices, and so on. As shown in FIG. 1, the sensor array 110 is coupled to the ECU 100 through the vehicle LAN 10. In an alternative embodiment, any of the sensors in the sensor array 110 may be directly connected to the ECU 100.

The powertrain system 120 controls the powertrain of the vehicle 1. For example, the powertrain system 120 may control the acceleration, deceleration, and braking of the vehicle 1. The powertrain system 120 includes a vehicle speed controller 122 which interfaces with external devices. In the present embodiment, the vehicle speed controller 122 receives command signals from the ECU 100, and controls the speed of the vehicle 1 in accordance with those command signals. In FIG. 1, the vehicle speed controller 122 is coupled to the ECU 100 through the vehicle LAN 10. In an alternative embodiment, the vehicle speed controller 122 may be directly connected to the ECU 100.

The steering system 130 controls the steering (i.e., the heading) of the vehicle 1 by controlling at least one of the wheels 2 of the vehicle 1. The steering system 130 includes a vehicle steering controller 132 which interfaces with external devices. In the present embodiment, the vehicle steering controller 132 receives command signals from the ECU 100, and controls the heading of the vehicle 1 in accordance with those command signals. In FIG. 1, the vehicle steering controller 132 is coupled to the ECU 100 through the vehicle LAN 10. In an alternative embodiment, the vehicle steering controller 132 may be directly connected to the ECU 100.

The wireless communication system 140 allows the vehicle 1 to communicate with other vehicles as well as infrastructure. Specifically, the wireless communication system 140 includes a vehicle-to-vehicle (V2V) transceiver 142 configured to allow communication with other vehicles as shown in FIG. 1. The wireless communication system 140 also includes a vehicle-to-infrastructure (V2I) transceiver 144 configured to allow communication with cloud/infrastructure 200. The V2V transceiver 142 may be an integrated communication unit that allows communication over a variety of communication protocols, such as one based on the IEEE 802.11 family of standards, one based on the 3GPP family of standards, and/or proprietary protocols. Similarly, the V2I transceiver 144 may be an integrated communication unit that allows communication over a variety of communication protocols, such as one based on the IEEE 802.11 family of standards, one based on the 3GPP family of standards, and/or proprietary protocols. In alternative embodiments, the V2V transceiver 142 and the V2I transceiver may be integrated into a single vehicle-to-everything (V2X) communication unit.

In addition to in-vehicle purposes, the sensor data collected by the sensor array 110 may be used for a variety of external applications. For example, the insurance field may use the sensor data collected from the sensor array 110 to determine an individual driver's insurance rates, perform an audit on a particular vehicular incident, and so on. In these cases, data confidence (i.e., trustworthiness) is an important area of focus, and as one proposed solution, consensus based algorithms are widely used in multi-agent systems to improve data confidence. In particular, blockchain technology allows consensus algorithms to be deployed on dynamic networks which can be constructed and deconstructed freely, while still providing improved data confidence.

However, using blockchain technology for automotive purposes presents several challenges, such as processing power and memory limitations. For example, implementing a large-scale blockchain network with many vehicle nodes may not be sufficiently efficient in terms of local processing and local data storage if each vehicle must process and store the data from every other vehicle in the network. To address this, the present disclosure is directed toward smaller-scale blockchain networks which are dynamically constructed and deconstructed based on certain preconditions. An exemplary embodiment will be described below in which blockchain networks are created based on physical proximity between a group of vehicles. Other preconditions may include, for example, physical zones in which blockchain networks are assigned to respective zones and participating nodes are the vehicles within each of those zones. Multiple preconditions may be used in combination where appropriate. For example, a combination of physical proximity and membership in a particular insurance system may be used.

Figure 2:
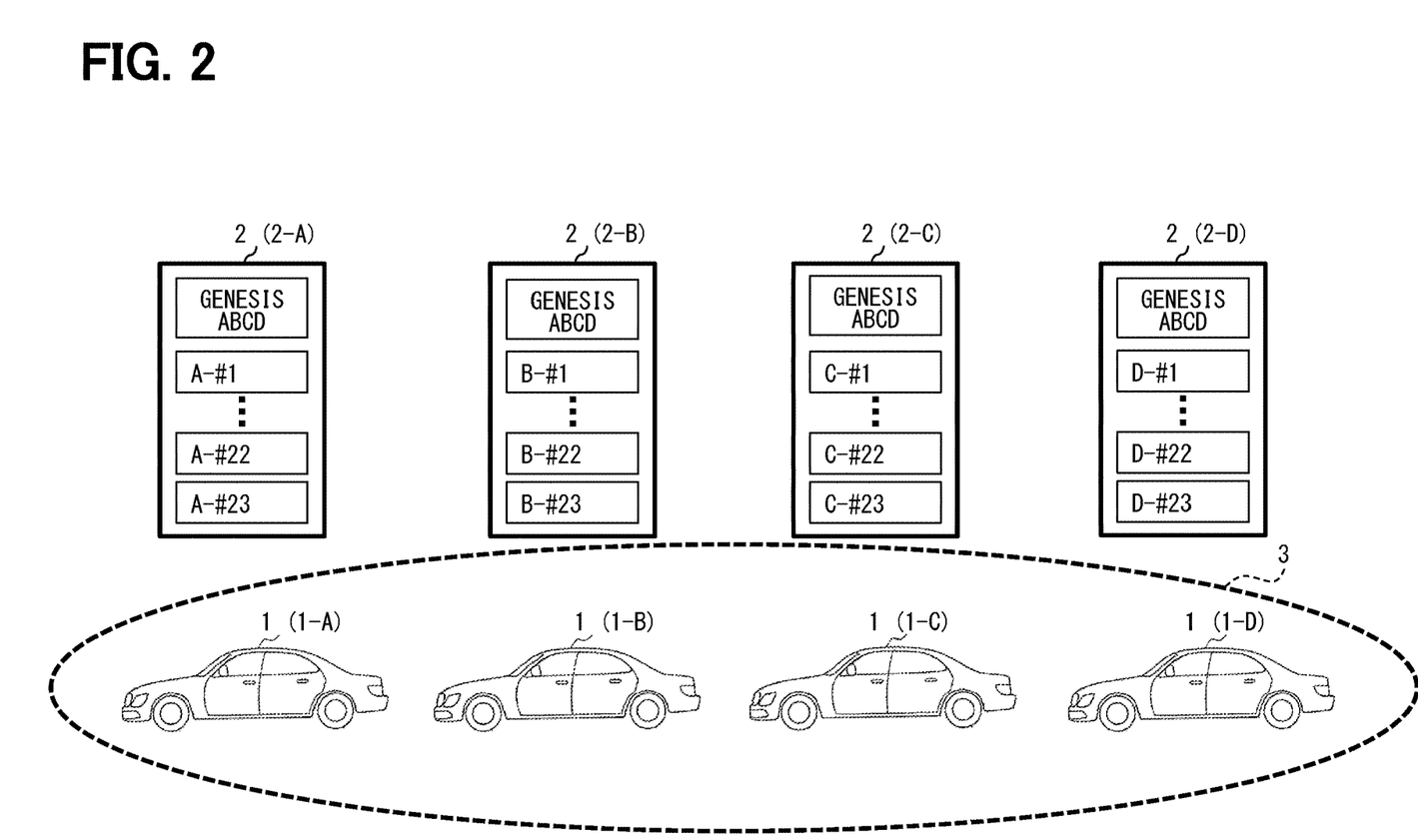
FIG. 2 is a view of a mobility blockchain network.

FIG. 2 shows an exemplary blockchain network 3 in which a plurality of vehicles 1 are participating. It should be noted that the present disclosure is not intended to be limited to a specific blockchain algorithm. Rather, the teachings of the present disclosure may be adapted to any number of blockchain algorithms. In addition, steps and details that are basic or commonplace in blockchain algorithms but not particularly relevant to the present disclosure are omitted for brevity where possible.

Each vehicle 1 stores a local copy of a blockchain 2 which is common to the entire network 3. In this example, four vehicles 1-A, 1-B, 1-C, 1-D are illustrated storing local blockchains 2-A, 2-B, 2-C, 2-D, respectively. In the illustrated example, each of the local blockchains 2-A, 2-B, 2-C, 2-D includes a genesis block and twenty three blocks at the illustrated point in time. As previously mentioned, in the present embodiment, physical proximity is assumed to be the precondition for creating dynamic networks. In other words, all of the vehicles 1-A, 1-B, 1-C, 1-D are physically proximate to each other. This may be, for example, in the case that the vehicle 1 includes autonomous driving capabilities, the vehicles speed controller 122 and the vehicle steering controller 132 may be controlled by an algorithm to travel within a convoy of autonomous vehicles, which creates a stable and continuous group of physically proximate vehicles for populating the network 3.

The genesis block includes data that identifies all participants within the network 3. In FIG. 2, this is visually represented as "GENESIS ABCD", referring to the individual vehicles 1-A, 1-B, 1-C, 1-D. It should be noted that this is only intended to be a visual aid. The actual genesis block would include the device ID of each participating vehicle 1 (e.g., their respective VIN), a hash of the genesis block, and other data required for whichever blockchain algorithm is implemented. The device ID of each vehicle 1 is used for the mining algorithm as will be described later, and therefore the genesis block of the blockchain 2 should be maintained in an up-to-date state for all participating vehicles 1 in the network 3.

The blocks are denoted for each participating vehicle (e.g., A-#1, B-#1, etc.). Of course, as a blockchain algorithm, the contents of all blocks at each block height should be identical to each other. Orphan branches may occur due to communication errors or other faults, but steps may be taken to reduce the likelihood of such occurrences, as will described later. In the present embodiment, each block in the blockchain 2 includes a sensor data pool of sensor data collected by all participating vehicles 1 within the network 3 for a time period corresponding to that block. It should be noted that "sensor data" here is not limited to the data collected by the sensor array 110 of each vehicle 1, and may broadly include any and all forms of mobility data that may originate from a vehicle. The time period length corresponding to each block may be determined as appropriate based on the application of the blockchain network 3. In addition, the specific types of data collected in the sensor data pool may be determined as appropriate based on the application of the blockchain network 3. The specific algorithms for mining the sensor data pool as blocks will be described later with.

As mentioned previously, the genesis block should be up-to-date with the device ID of each participating vehicle 1. As a result, when any of the vehicles 1-A, 1-B, 1-C, 1-D leaves the network 3, or when a new vehicle 1 joins the network 3, the genesis block should be recreated with updated device ID information from the updated listed of participating vehicles 1. Reasons for leaving the network 3 may include, for example, no longer meeting the preconditions for being in the network 3 (e.g., in the present embodiment, physically leaving the group area and no longer having physical proximity to the other vehicles) or communication failures.

Figure 3:
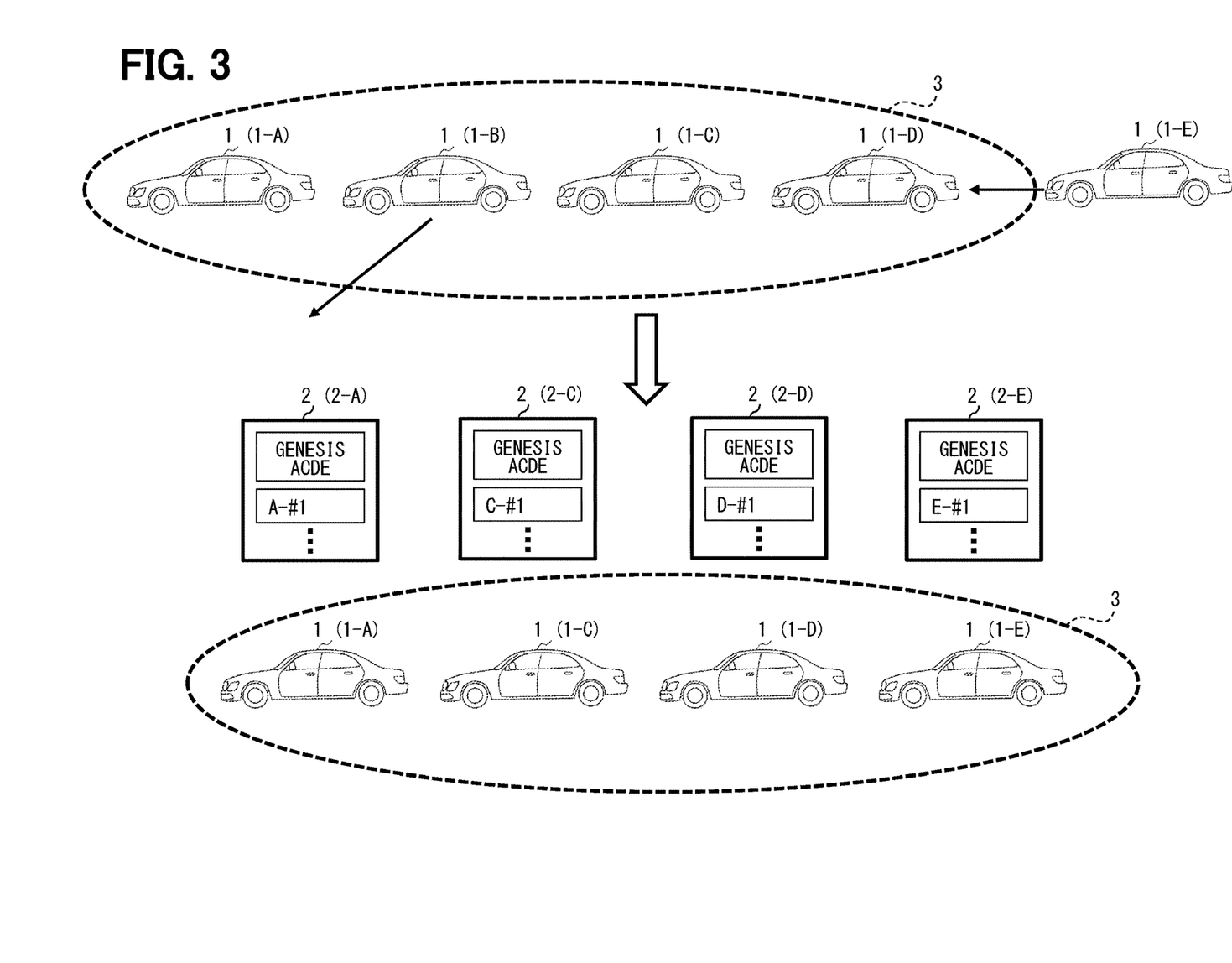
FIG. 3 is a view of a member migration in a mobility blockchain network.

FIG. 3 is a visual representation of the network 3 being dynamically recreated in response to network member migration. In FIG. 3, a situation is illustrated in which vehicle 1-B is leaving the group, and vehicle 1-E is newly entering the group. As a result of the member migration, the previous blockchain 2 shown in FIG. 2 is terminated, and a new blockchain 2 is started as shown in FIG. 3. In the new blockchain 2, the genesis block includes device ID information for vehicles 1-A, 1-C, 1-D, 1-E, as illustrated ("GENESIS ACDE"). In addition, the current block height of the blockchain 2 is restarted at #1, and the sensor pool data included in each block includes the sensor data collected by the vehicles 1-A, 1-C, 1-D, 1-E.

Figure 4:
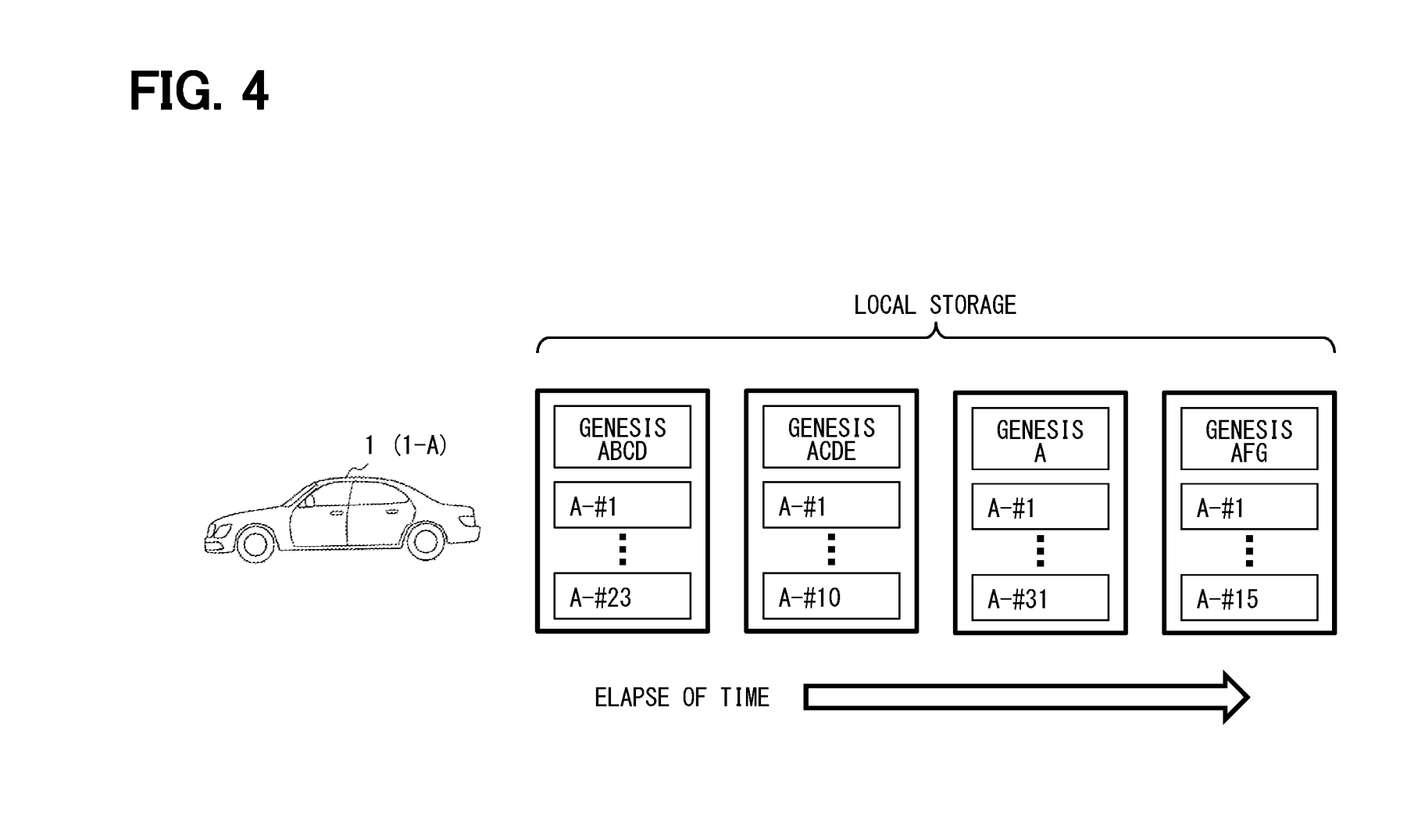
FIG. 4 is a view of local storage of mobility data.

In this way, each individual vehicle 1 participates in a plurality of dynamic networks 3 over time, creating and storing a blockchain for each network each time member migration occurs. For example, FIG. 4 illustrates vehicle 1-A with four blockchains in local storage, acquired over time in sequence (i.e., first blocks #1 to #23 of group ABCD, then blocks #1 to #10 of group ACDE, and so on). As illustrated, each of these blockchains include a genesis block with different device ID information indicating different groups of participating vehicles. Further, as shown by "GENESIS A", it is conceivable that a blockchain network may consist of a single vehicle 1, for example if no other vehicles are in sufficiently close proximity or otherwise meet the preconditions for joining the network. Cumulatively, these four blockchains include sensor data acquired by the vehicle 1-A over time, along with the sensor data of participating vehicles in each respective group. In this regard, the individual blockchains stored in local storage of each vehicle 1 may be referred to as sub-chains, each sub-chain only stores a time-sequenced portion of the sensor data collected by the vehicle 1.

These sub-chains may be uploaded to the cloud/infrastructure 200 through the V2I transceiver 144 of each vehicle 1 whenever such a connection is possible, e.g., when the vehicle 1 passes by a cellular tower, or when the vehicle 1 stops at a gas station equipped with infrastructure communication equipment. On the cloud/infrastructure 200 side, the numerous sub-chains uploaded by the plurality of vehicles 1 may be unpacked to verify the sensor data therein, and then combined into a master blockchain including time-sequenced sensor data from all participating vehicles 1.

Figure 5:
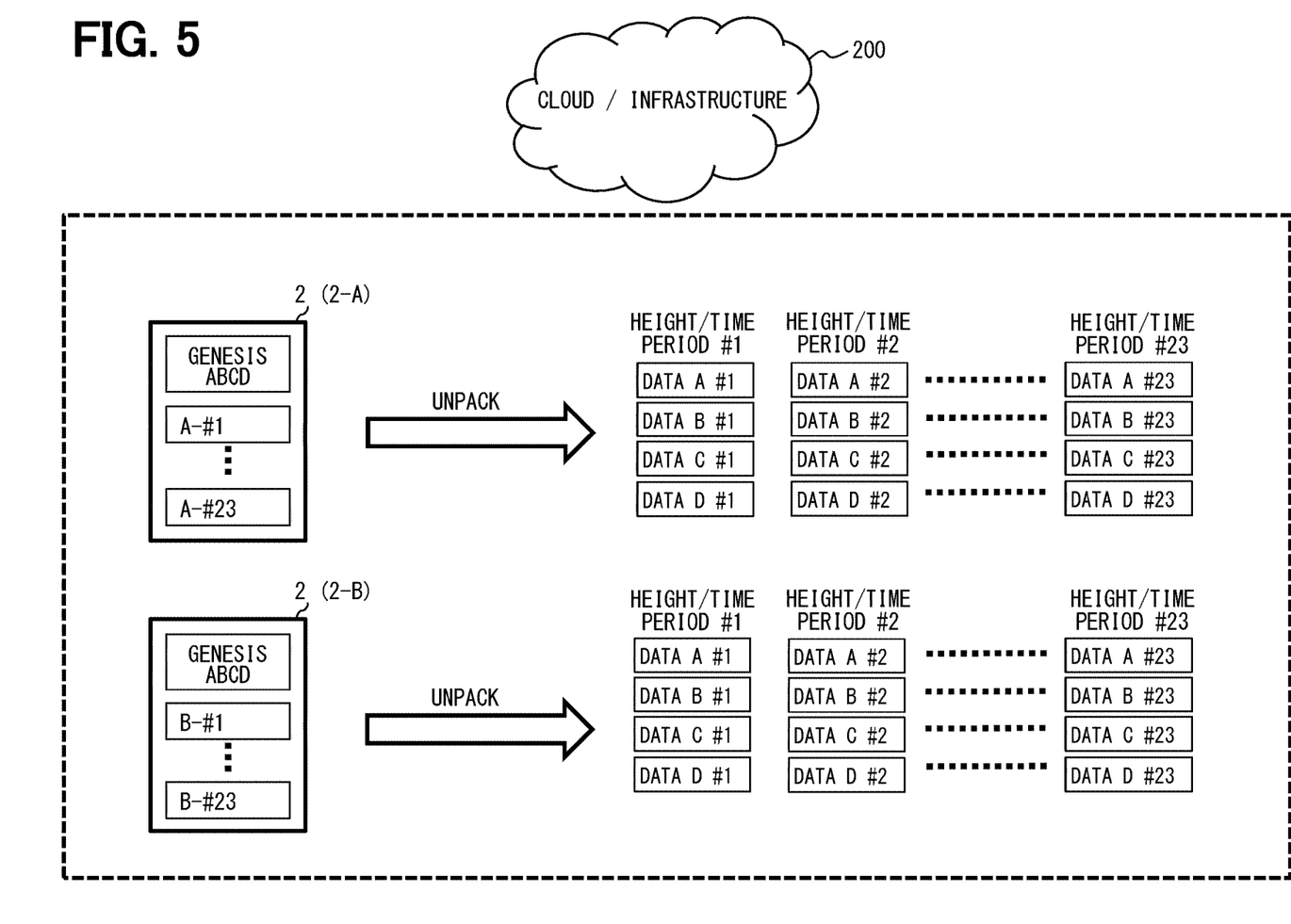
FIG. 5 is a view of server storage of mobility data.

For example, FIG. 5 illustrates a server side unpacking routine in which the cloud/infrastructure 200 has received sub-chains 2-A and 2-B from two participating vehicles 1-A and 1-B from the same group. As illustrated, the unpacked data from the sub-chain 2-A is identical to the unpacked data from the sub-chain 2-B, and includes sensor data from each of the vehicles 1-A, 1-B, 1-C, 1-D in the group in a time sequenced chain (shown by block height/time period #). In this manner, server side authentication and verification of the unpacked data is possible to ensure that data tampering or falsification has not occurred. The level of data confidence scales with the size of the group, as larger group sizes imply a higher level of difficulty for modifying or otherwise falsifying the data. In addition, even if a particular vehicle 1 suffers technical failures and is unable to upload data, the sensor data of the particular vehicle 1 is included in the sub-chains uploaded by other vehicles 1 that participated in the same networks as the particular vehicle 1. In this regard, both data preservation and data security is improved.

Figure 6:
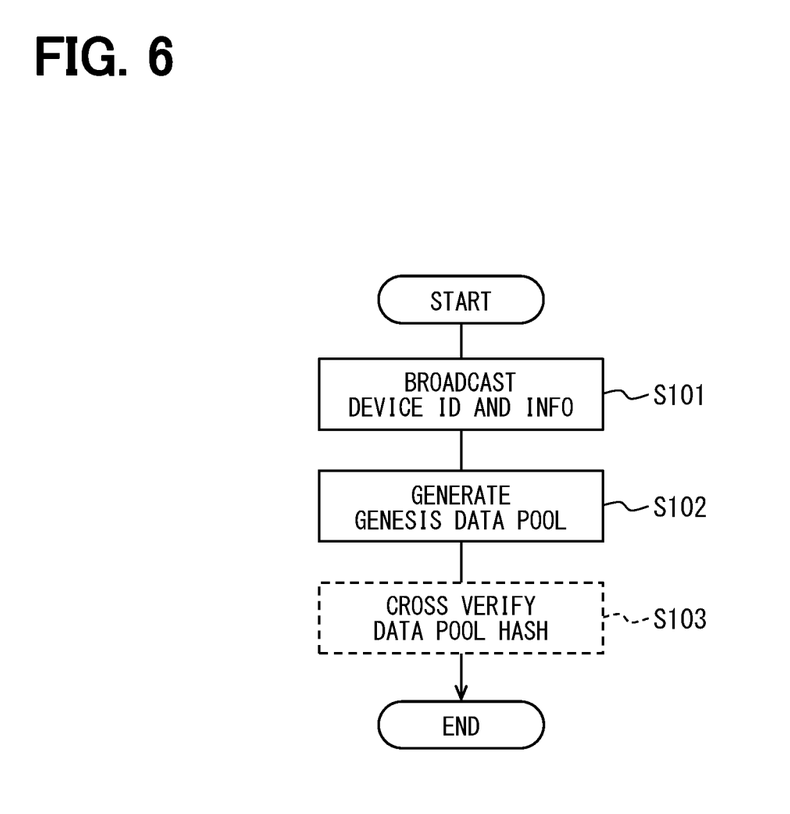
FIG. 6 is a flowchart showing a method of generating genesis data pool.

Next, the specific algorithms for storing mobility data will be described. FIG. 6 shows a generalized processing method for generating the genesis data used to mine the genesis block of each blockchain 2. In particular, the contents of FIG. 6 are performed each time member migration occurs and a new network 3 is created. As previously mentioned, the specific preconditions for creating the network 3 may be determined as appropriate based on the specific application at hand, and is not within the purview of this exemplary embodiment. It is thus assumed that by the time the processing method of FIG. 6 is performed, the participating members of the network 3 are already determined based on those preconditions.

In step S101, the ECU 100 of each vehicle 1 within the network 3 broadcasts their respective device ID and other information to each other. Here, the other information refers to any information required for the actual blockchain algorithm implemented, and therefore may be determined as appropriate based on the selected algorithm. The device ID is a value that uniquely identifies each vehicle 1 within the network. The device ID may be, for example, the VIN of each vehicle 1, an insurance ID, or some other form of ID.

At step S102, the ECU 100 of each vehicle 1 generates a genesis data pool used to create the genesis block of the new blockchain 2. Then, the genesis data pool is mined into the genesis block. The details of the miner selection process and the mining process itself will be described later with respect to FIGS. 8 and 9.

FIG. 6 also shows a step S103 in which a hash value of the genesis data pool is cross verified among the plurality of vehicles 1 within the network 3. This step is shown as an optional step as the hash value of the genesis data pool may be verified at a different stage such as during the miner selection and mining process. In any case, in order to ensure that each vehicle 1 holds the same genesis data pool as each other, a cross verification step is preferably performed after S102.

Figure 7:
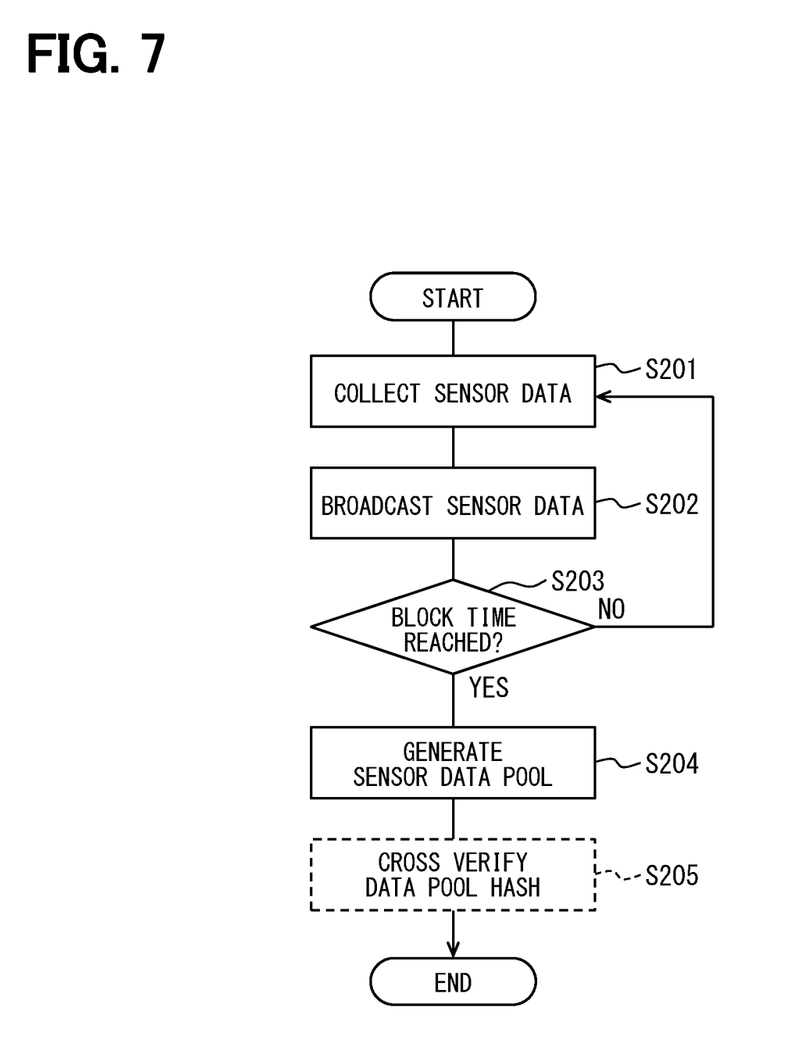
FIG. 7 is a flowchart showing a method of generating sensor data pool.

FIG. 7 shows a generalized processing method for generating the sensor data pool used to mine each subsequent block in the blockchain 2. In step S201, the ECU 100 of each vehicle 1 within the network 3 collects sensor data. This data collection step is purposely broad to include a variety types of collection methods that may be determined as appropriate based on the application at hand. For instance, an application in insurance may require speed and location data with high sampling rate, whereas an application in maintenance may require a wide breadth of data but with relatively low sampling rate.

Next, at step S202, the ECU 100 of each vehicle 1 broadcasts their collected sensor data to each other. Specifically, the ECU 100 of each vehicle 1 stores the broadcasted sensor data from all other vehicles 1.

Next, at step S203, the ECU 100 of each vehicle 1 determines whether a block time has been reached since the start of the sensor data collection. Here, the block time refers to the length of time assigned to each block of the blockchain 2 implemented in the network 3. The block time may be set as appropriate based on the specific application at hand.

It should be noted that steps S201 to S203 is only intended to be an example implementation of the sensor data collection process, and a variety of modifications are contemplated. For example, S203 may be skipped entirely if the sensor data collection step S201 is configured with a duration equal to the block time. Further alternatively, the sensor data broadcasting step S202 may be performed after S203, i.e., broadcasting all collected sensor data together after the block time is reached. In this regard, steps S201 to S203 is only intended to provide one technical implementation as an explanatory tool, to which the present disclosure is not limited.

Then, at step S204, the ECU 100 of each vehicle 1 generates a sensor data pool used to mine the subsequent block of the blockchain 2. Then, the sensor data pool is mined into a block. The details of the miner selection process and the mining process itself will be described below with respect to FIGS. 8 and 9. In particular, the miner selection and mining process is the same for both the genesis block and the subsequent data blocks. Accordingly, the processing steps of FIGS. 8 and 9 will only be described once which is equally applicable to both the genesis block and the subsequent data blocks.

FIG. 7 also shows a step S205 in which a hash value of the sensor data pool is cross verified among the plurality of vehicles 1 within the network 3. This step is shown as an optional step as the hash value of the sensor data pool may be verified at a different stage such as during the miner selection and mining process. In any case, in order to ensure that each vehicle 1 holds the same sensor data pool as each other, a cross verification step is preferably performed after step S204.

As mentioned above, each vehicle 1 in the network 3 has already been determined to meet one or more preconditions for joining the network 3. In this regard, each vehicle 1 is already approved for participating in the network 3. As a result, the right to mine blocks is already implicitly held by each node (i.e., each vehicle 1), which removes the need for a barrier to entry such as proof of work. Removing these kind of barriers to entry reduces processing complexity and time. In the present disclosure, to provide improved data confidence and also to reduce the threat of an insider attack, the right to mine (or commit) blocks is randomly selected among the plurality of vehicles 1 in the blockchain network 3.

Figure 8:
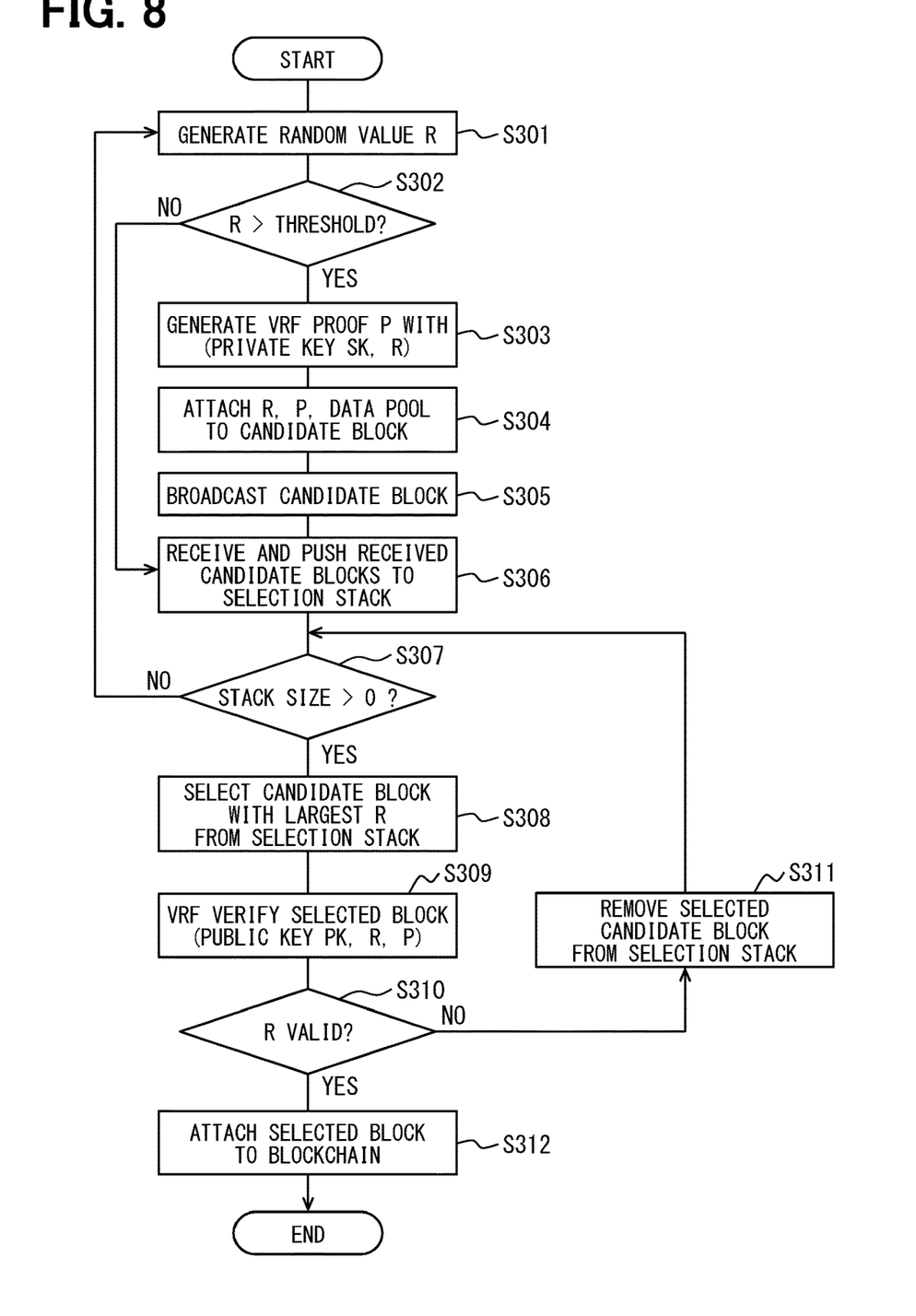
FIG. 8 is a flowchart showing a method of storing mobility data.

The process steps of FIG. 8 are performed by the ECU 100 of each vehicle 1 within the network 3. Specifically, at step S301 in FIG. 8, the ECU 100 generates a random value R. The present disclosure is not limited to a particular range for the value of R. For the sake of simplicity, in the present embodiment, the range of R is assumed to be between 0 and n, inclusively, where n is the number of vehicles 1 within the network 3.

Next, at step S301, the ECU 100 determines whether their generated random value R is greater than a threshold. The present disclosure is not limited to a particular threshold. For the sake of simplicity, in the present embodiment, the threshold is assumed to be n/2. However, the threshold should be leave for implemental purposes. For example, the threshold may vary based on the ratio of the group size and may be also dynamically determined based on the data importance and data frequency.

If the determination at step S302 is "no", the process continues to step S306, which will be described later. In contrast, if the determination at step S302 is "yes", the process continues to step S303.

At step S303, the ECU 100 generates a verifiable random function (VRF) proof P with private key SK and R. The present embodiment is not intended to be limited to a particular VRF here. For example, the RSA Full Doman Hash VRF (SDA-FDH-VRF) may be used. Other VRF such as elliptic curve VRF (EC-VRF) may be used as well. Preferably, a VRF with collision resistance properties are used to avoid collision errors which would necessitate additional rounds of processing. The random value R is used as the input value of the VRF. The private key SK is securely stored within the memory 104 of each ECU 100.

Next, at step S304, the ECU 100 attaches the random value R, the proof P, and the data pool created with the steps of FIG. 6 or 7 (i.e., either genesis data pool or sensor data pool) to a new candidate block for mining. Regarding other contents of the candidate block, as previously mentioned, steps and details that are basic or commonplace in blockchain algorithms but not particularly relevant to the present disclosure are omitted for brevity where possible. Here, such commonplace steps may include, for example, verifying the hash of the previous block in the blockchain 2 against the data of the new candidate block. In addition, the candidate block may include additional information as appropriate for performing these commonplace steps, such as hash data.

Next, at step S305, the ECU 100 broadcasts the candidate block to all other vehicles 1 within the network 3 via the V2V transceiver 142.

Next, at step S306, the ECU 100 receives broadcasted candidate blocks and pushes all received candidate blocks (including an own candidate block if applicable) onto a selection stack. Here, the selection stack is simply an area in the memory 104 of each ECU 100 storing the broadcasted candidate blocks. As previously mentioned, any ECU 100 which determined "no" at step S302 would continue directed to step S306. In other words, even those ECUs 100 which did not generate a VRF proof and did not broadcast a candidate block would still receive all broadcasted candidate blocks and push them onto a selection stack.

Next, at step S307, the ECU 100 determines whether the size of the selection stack (i.e., the number of candidate blocks in the selection stack) is greater than zero. If the determination at step S307 is "no", the process returns to step S301 and repeats the candidate block generation process. It is possible for the selection stack size to be zero if none of the vehicles 1 in the network generates a random value R over the threshold, for example. In addition, it is possible for the selection stack size to be reduced to zero if all candidate blocks fail a verification step to be described below.

Next, at step S308, the ECU 100 selects the candidate block with the largest random value R from the selection stack. As previously mentioned, the random value R is attached to each candidate block and therefore is readily accessible to all ECUs 100. Here, a collision error may occur if two candidate blocks within the selection stack have the same largest random value R. If a collision occurs, in the present embodiment, the ECUs 100 which broadcasted the candidate blocks with the same largest random value R would return to step S301 to generate a new random value R and repeat the subsequent steps. To reduce the odds of a collision occurring, the threshold for the random value R may be dynamically altered based on group size to reduce the number of broadcasted candidate blocks for large groups.

Next, at step S309, the ECU 100 performs VRF verification on the selected block with the random value R and the proof P attached to the selected block against a public key PK of the vehicle 1 that broadcasted the selected block. In the present embodiment, for ease of processing, the public key PK is the device ID of each vehicle 1 as included in the genesis data of the genesis block of the blockchain 2. Of course, in alternative implementations, the public key PK may be stored in the genesis block in some other format, and may be unrelated to the device ID of each vehicle 1.

The specific processing during the VRF verification step depends on the VRF selected for use. Since the present disclosure is not intended to be specific to any particular VRF, in generalized terms, the public key PK, the random value R, and the proof P are used as inputs for the VRF verification function, and an output of "VALID" or "INVALID" is received.

Next, at step S310, the ECU 100 determines whether the result of the VRF verification at step S309 is "VALID" or not. If the determination at step S310 is "no", the process continues to step S311.

At step S311, the ECU 100 removes the selected candidate block (i.e., the block selected during the previous instance of step S308) from the selection block for failing VRF verification. Then, the process returns to step S307 to check whether the stack size is still greater than zero after removing the previously selected block.

If the determination at step S310 is "yes", the process continues to step S312. At step S312, the ECU 100 attaches the selected block to the locally stored blockchain 2. In other words, the ECU 100 formally mines/commits the selected block to its local blockchain 2, and the process ends.

As outlined above, the miner selection and mining process of the present embodiment provides an improved mobility data storage method. In particular, as shown in FIG. 8, miner selection and block commitment are both performed with a single broadcasting step at S305. In other words, when at least one valid candidate block is generated (i.e., selection stack size never falls to zero), a consensus block can be reached with a single broadcasting step. Specifically, in the exemplary embodiment shown in FIG. 8, the VRF proof P and random value R are both attached to the candidate block at S304 along with the data pool to be mined. This enables a downstream vetting of the VRF proof and subsequent commitment of the selected candidate block without need a second round of broadcasting.

For example, consider an comparative example in which a miner selection process is performed first, in which VRF proof P and random value R are broadcast to select a miner vehicle. In this case, after receiving the selection result, the selected miner vehicle would then mine and broadcast the mined block to the network. In this case, in addition to performing two rounds of broadcasting data, verification steps would need to be performed for both rounds of broadcasting which further increases overhead. In addition, the time delays associated with receiving the selection result and then broadcasting the mined block even further increases overhead.

In contrast, the present disclosure provides a streamlined mobility data storage method that minimizes both physical overhead and processing overhead. Specifically, by minimizing the number of broadcast rounds, physical overhead (i.e., wireless communication and time requirement) itself is minimized. In other words, the advantages of the present disclosure are manifested as a physically meaningful improvement in a practical application.

In addition, the overall streamlining of the miner selection and mining process also reduces processing overhead. As previously mentioned with respect to the comparative example, the above embodiment of the present disclosure reduces the number of verification steps and other ancillary processing steps associated with receiving the selection result and then broadcasting the mined block in a separate broadcasting step. In this regard, the computing capabilities of the ECU 100 of each vehicle 1 is also improved in a concrete manner.

Second Embodiment

Next, a second embodiment of the present disclosure will be described with reference to FIG. 9.

Figure 9:
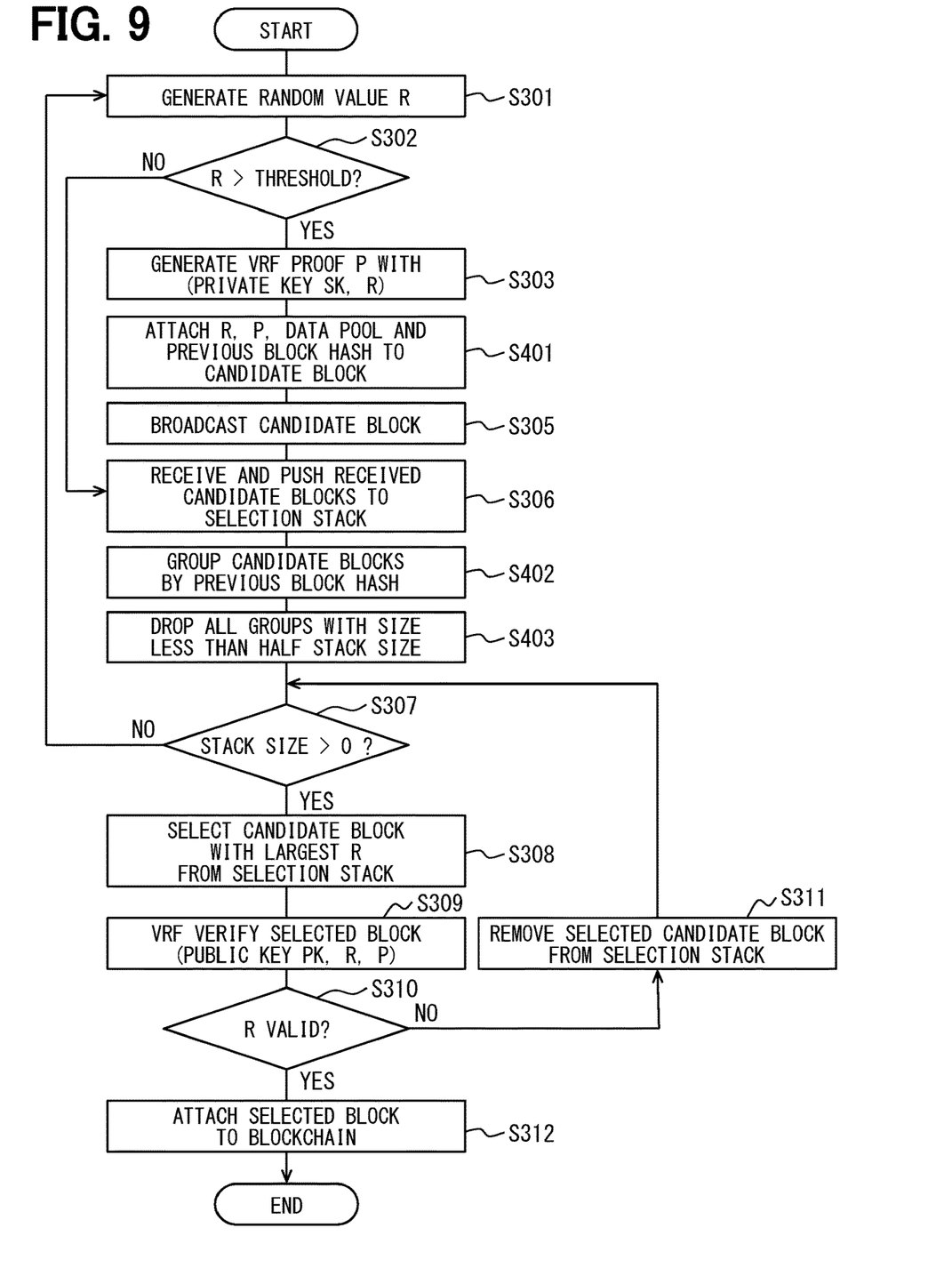
FIG. 9 is a flowchart showing a method of storing mobility data.

Steps S301 to S303 and S305 to S312 in FIG. 9 are the same as those in FIG. 8, and their descriptions will be omitted for brevity.

In FIG. 9, after S303, the process continues to step S401. In step S401, in addition to the random value R, the VRF proof P, and the data pool, the ECU 100 further attached the hash value of the previous block of the local blockchain 2 to the candidate block.

Then, after all candidate blocks are broadcasted and received at step S306, the process continues to step S402. At step S402, the ECU 100 of each vehicle 1 groups the received candidate blocks by the hash value of the previous block attached in step S401. Then, the process continues to step S403.

At step S403, the ECU 100 of each vehicle 1 drops all candidate block groups from the selection stack if the group size is less than half the size of the selection stack. In other words, any candidate blocks which do not have the same previous block hash as the majority group of candidate blocks is dropped from the selection stack of all vehicles 1. Another implication of this is that if no majority consensus is reached for the previous block hash (i.e., no group is at least half stack size), then all candidate blocks are dropped from the selection stack.

In the present embodiment, a self-recovery function with respect to the continuity of the blockchain 2 is implemented as steps S401, S402, S403 detailed above. Specifically, the previous block hash is attached to each candidate at step S401, and a consensus check is performed at step S402 and S403. As a result, the ECU 100 of each vehicle 1 within the network 3 is able to ensure that blockchain continuity is maintained, i.e., orphan branches are not created within the network 3. This is because, in practice, communication failures or other errors may inevitably result in the creation of orphan branches—in other words, subsets of the network mining different blocks as each other.

In this regard, the self-recovery function of the present embodiment improves the likelihood that consensus is maintained within the network 3, and also allows for corrective action to be performed in response to detecting that consensus has broken down (i.e., continued lack of majority consensus for the previous block hash). Such corrective action may include, for example, deconstructing and reconstructing the network 3 with a new genesis block to start the blockchain 2 again.

It should be noted that the above-described embodiments are merely examples of applications of the present disclosure and various modifications to the embodiments may be acceptable. For example, the use case of tamper proof data is not necessarily limited for the autonomous driving. The tamper proof data may be used as vehicle lifetime traceability data to support various MaaS services, such as insurance services, vehicle remaining value judgements, and accident investigations.

The above description is merely illustrative in nature and is in no way intended to limit the present disclosure. The broad teachings of the present disclosure can be implemented in a variety of forms. Therefore, while this disclosure includes particular examples, the true scope of the present disclosure should not be so limited since other modifications will become apparent upon a study of the drawings, the specification, and the following claims. It should be understood that one or more steps within a method may be executed in different order (or concurrently) without altering the principles of the present disclosure.

The above embodiments of the present disclosure are described with respect to a vehicle mounted ECU and its constituent processor and memory. However, this disclosure is not intended to be limiting. The methods and processes described herein may be partially or fully implemented by a special purpose computer created by programming a general purpose computer to execute one or more particular functions embodied in computer programs, in combination with specialized hardware and circuitry (such as ASICs), or with specialized hardware and circuitry alone. The functional blocks, flowchart components, and other elements described above serve as software specifications, which can be translated into the computer programs by the routine work of a skilled technician or programmer.

The invention claimed is:

1. A mobility data storage method executed by a plurality of vehicles each including a sensor and a processor coupled to the sensor, the processor of each of the plurality of vehicles being configured to store a local blockchain, the method comprising:
   acquiring, with the processor of each of the plurality of vehicles, sensor data via the sensor and broadcasting the sensor data to all other ones of the plurality of vehicles to generate a sensor data pool;
   generating, with the processor of each of the plurality of vehicles, a random value;
   generating, with the processor of each of a subset of the plurality of vehicles whose corresponding random value is greater than a predetermined threshold, a verifiable random function (VRF) proof using the corresponding random value as an input value for the VRF;
   attaching, with the processor of each of the subset of the plurality of vehicles, the sensor data pool, the corresponding random value, and the corresponding VRF proof to a respective candidate block;
   broadcasting, with the processor of each of the subset of the plurality of vehicles, the candidate block to all other processors of the plurality of vehicles;
   selecting, with the processor of each of the plurality of vehicles, a particular candidate block whose random value is largest among the broadcasted candidate blocks;
   verifying, with the processor of each of the plurality of vehicles, the random value and the VRF proof attached to the selected block against a public key of the corresponding vehicle whose processor broadcasted the selected block; and
   attaching, with the processor of each of the plurality of vehicles, the selected block to the corresponding local blockchain upon valid verification of the selected block.

2. The mobility data storage method of claim 1, wherein the random value is generated as an integer between 0 and n, inclusively, and the predetermined threshold is n/2, where n is the number of the plurality of vehicles.

3. The mobility data storage method of claim 1, wherein the VRF is an RSA Full Doman Hash VRF (SDA-FDH-VRF).

4. The mobility data storage method of claim 1, further comprising:
   upon invalid verification of the selected block, reselecting, with the processor of each of the plurality of vehicles, another candidate block whose random value is next largest among the broadcasted candidate blocks; and
   repeating the reselecting step until valid verification of the reselected block.

5. The mobility data storage method of claim 1, further comprising:
   attaching, with the processor of each of the subset of the plurality of vehicles, a previous block hash at a tail of the corresponding candidate block prior to broadcasting the corresponding candidate block; and
   prior to the selecting step, dropping, with the processor of each of the plurality of vehicles, any broadcasted candidate blocks whose previous block hash is not identical to those of a majority of all of the broadcasted blocks.

6. The mobility data storage method of claim 1, further comprising:
   when a particular plurality of the broadcasted candidate blocks include a same largest random value, generating a new random value with the processor of each of the plurality of vehicles whose broadcasted candidate block includes the same largest random value.

7. A mobility data storage system, comprising:
   a plurality of vehicles each including a sensor and a processor coupled to the sensor, the sensor being configured to acquire sensor data, the processor of each of the plurality of vehicles being configured to store a local blockchain, wherein the processor of each of the plurality of vehicles is programmed to:
   broadcast the sensor data to all other ones of the plurality of vehicles to generate a sensor data pool,
   generate a random value,
   when the generated random value is great than a predetermined threshold:
      generate a verifiable random function (VRF) proof using the random value as an input value for the VRF,
      attach the sensor data pool, the random value, and the VRF proof to a candidate block, and
      broadcast the candidate block to all other processors of the plurality of vehicles,
   select a particular candidate block whose random value is largest among the broadcasted candidate blocks, verify the random value and the VRF proof attached to the selected block against a public key of the corresponding vehicle whose processor broadcasted the selected block, and attach the selected block to the local blockchain upon valid verification of the selected block.

8. The mobility data storage system of claim 7, wherein the random value is generated as an integer between 0 and n, inclusively, and the predetermined threshold is n/2, where n is the number of the plurality of vehicles.

9. The mobility data storage system of claim 7, wherein the VRF is an RSA Full Doman Hash VRF (SDA-FDH-VRF).

10. The mobility data storage system of claim 7, wherein the processor of each of the plurality of vehicles is further programmed to:

upon invalid verification of the selected block, reselecting another particular candidate block whose random value is next largest among the broadcasted candidate blocks, and repeating the reselection until valid verification of the reselected block.

11. The mobility data storage system of claim 7, wherein the processor of each of the plurality of vehicles is further programmed to:

when the generated random value is greater than the predetermined threshold, attaching a previous block hash at a tail of the candidate block prior to broadcasting the candidate block, and prior to the selection, dropping any broadcasted candidate blocks whose previous block hash is not identical to those of a majority of all of the broadcasted candidate blocks.

12. The mobility data storage system of claim 7, wherein the processor of each of the plurality of vehicles is further programmed to:

when the generated random value is largest among all broadcasted candidate blocks and equal to that of another broadcasted candidate block, generating a new random value and broadcasting a new candidate block with the new random value.

* * * * *